US011499752B2

(12) United States Patent
Chaudhry

(10) Patent No.: US 11,499,752 B2
(45) Date of Patent: Nov. 15, 2022

(54) SYSTEMS AND METHODS FOR PREVENTING SHORT CYCLING IN HIGH-EFFICIENCY WATER HEATERS

(71) Applicant: Rheem Manufacturing Company, Atlanta, GA (US)

(72) Inventor: Raheel A. Chaudhry, Montgomery, AL (US)

(73) Assignee: RHEEM MANUFACTURING COMPANY, Atlanta, GA (US)

( * ) Notice: Subject to any disclaimer, the term of this patent is extended or adjusted under 35 U.S.C. 154(b) by 70 days.

(21) Appl. No.: 16/848,996

(22) Filed: Apr. 15, 2020

(65) Prior Publication Data

US 2021/0325087 A1    Oct. 21, 2021

(51) Int. Cl.
*F24H 9/20* (2022.01)
*G05D 23/19* (2006.01)
*F24H 1/18* (2022.01)
*F24H 8/00* (2022.01)

(52) U.S. Cl.
CPC ......... *F24H 9/2035* (2013.01); *F24H 1/186* (2013.01); *G05D 23/1904* (2013.01); *G05D 23/1917* (2013.01); *F24H 8/00* (2013.01)

(58) Field of Classification Search
CPC ......... F24H 9/2035; F24H 1/186; F24H 8/00; G05D 23/1904; G05D 23/1917; F23N 1/082
USPC ...................................... 122/14.22
See application file for complete search history.

(56) References Cited

U.S. PATENT DOCUMENTS

| | | | | |
|---|---|---|---|---|
| 7,712,677 | B1* | 5/2010 | Munsterhuis | F24H 9/2035 236/20 R |
| 7,798,107 | B2* | 9/2010 | Chian | G05D 23/1904 236/20 R |
| 8,322,312 | B2* | 12/2012 | Strand | F24H 9/2007 700/300 |
| 2004/0173600 | A1* | 9/2004 | Munsterhuis | F24H 9/2035 219/494 |
| 2006/0013572 | A1* | 1/2006 | Phillips | F24H 9/2021 392/459 |
| 2010/0300377 | A1* | 12/2010 | Buescher | F24H 1/186 122/14.1 |
| 2013/0092102 | A1* | 4/2013 | Chaudhry | F24H 9/2021 122/14.22 |
| 2013/0092103 | A1* | 4/2013 | Strand | F24H 9/2035 122/14.22 |
| 2013/0270350 | A1* | 10/2013 | Subramanian | G05D 23/1917 236/20 R |
| 2015/0220091 | A1* | 8/2015 | Koopman | F24H 1/205 700/300 |
| 2019/0243396 | A1* | 8/2019 | Sobieski | F24H 9/2007 |
| 2019/0285315 | A1* | 9/2019 | Chaudhry | F24H 8/00 |
| 2021/0055005 | A1* | 2/2021 | Humphrey | F24D 17/0078 |
| 2021/0095892 | A1* | 4/2021 | Buescher | F24H 9/2035 |

* cited by examiner

*Primary Examiner* — Gregory A Wilson
(74) *Attorney, Agent, or Firm* — Eversheds Sutherland (US) LLP

(57) ABSTRACT

The disclosed technology includes a system and method of preventing short cycling in a water heater. The system can include a burner, a temperature sensor, and a controller. The controller can be configured to perform several steps to determine whether to turn on a burner and whether to increment a temperature offset value based on the amount of time that has elapsed since the last time the burner was on.

20 Claims, 2 Drawing Sheets

SYSTEMS AND METHODS FOR PREVENTING SHORT CYCLING IN HIGH-EFFICIENCY WATER HEATERS

FIELD OF TECHNOLOGY

The present disclosure relates generally to systems and methods for preventing short cycling in high-efficiency water heaters.

BACKGROUND

In many water heater systems, combustible matter, such as oil, propane, or natural gas, is passed into a combustion chamber (or burner) and ignited to heat water. The combustion chamber and the exhaust system are positioned to pass the hot combustion gases (flue gases) through a heat exchanger to heat the water and then release the combustion gases to the atmosphere. The water heater system is configured to ignite the burner as the temperature of the water in the system falls below a low temperature threshold. The burner continues to add heat to the system until the water reaches a high temperature threshold, at which point the burner is switched off. This cycle repeats periodically to maintain the temperature of the water within a target temperature range.

To increase the efficiency of the heating process, some water heaters are designed to pass the hot combustion gases through multiple stages of a heat exchanger to extract as much of the heat as possible from the combustion gases. These high-efficiency water heating systems are often referred to as condensing water heaters because the combustion gases are often cooled to the point where moisture in the exhaust condenses in the heat exchanger prior to exiting to the atmosphere. In these and similar systems, some condensate will continue to accumulate in the exhaust the longer the exhaust is allowed to cool. During normal operating conditions, the condensate is turned to steam and vented to the atmosphere through the exhaust as the heater reignites to restart the combustion process and provide heated gases to the heat exchanger and exhaust.

Occasionally, a condition known as short cycling can occur. Short cycling relates to the water heater system cycling, or repeating the heating process, too frequently. During short cycling, the burner is repeatedly ignited for short durations which can reduce the lifespan of the water heater system, waste energy, and lead to higher maintenance costs. In high-efficiency water heaters, short cycling can be particularly troublesome because the burner is unable to heat the combustion gases long enough to turn a sufficient amount of the condensate into steam. The condensate can eventually accumulate until it blocks the heat exchanger and renders the water heater inoperable. The water heater can often remain inoperable until the water heater is shut down and repaired to clear the condensate. Accordingly, there is a need for a water heater system that can prevent short cycling and reduce the likelihood of condensate build-up rendering a water heater inoperable. This and other problems are addressed by the technology disclosed herein.

SUMMARY

The disclosed technology relates generally to systems and methods for preventing short cycling in high-efficiency water heaters. The disclosed technology includes a system that can include a water heater system having a burner to burn a fuel and produce heat, a heat exchanger arranged to heat water in a heating chamber, a temperature sensor to detect the water temperature, and a controller. The controller can be configured to receive temperature data from the temperature sensor and to control the burner. If the controller determines that the burner is on, the controller can set a current temperature offset value equal to zero. If the controller determines that the burner is off, the controller can perform a temperature determination that includes (i) determining a temperature threshold value by subtracting a differential temperature value and the current temperature offset value from a temperature set point value and (ii) determining, based on the temperature data, whether the temperature of the fluid is less than or equal to the temperature threshold value. If the controller determines that the temperature of the fluid is less than or equal to the temperature threshold value, the controller can output instructions for the burner to turn on.

If the controller determines that (i) the temperature of the fluid is less than or equal to the temperature threshold value and (ii) the current temperature offset value is not equal to zero, the controller can set the current temperature offset value to zero.

If the controller determines that (i) the temperature of the fluid is greater than the temperature threshold value and (ii) an elapsed time since the burner was last on is greater than or equal to a time threshold value, the controller can determine whether a maximum temperature offset value is greater than the current temperature offset value. If the maximum temperature offset value is less than the current temperature offset value, the controller can increment the current temperature offset value and perform the temperature determination.

The water heater system can include a user interface configured to receive user input which, among other things, can be a remote computing mobile device. The user interface can be used to receive one or more inputs from a user, and the input(s) can be indicative of at least one of a temperature set point value, a differential temperature value, a time threshold value, and a maximum temperature offset value.

The disclosed technology also includes a method for preventing short cycling in a water heater system. The method can include determining whether a burner is on and if the burner is on, setting a current temperature offset value equal to zero. The method can include performing a temperature determination if the burner is off. The temperature determination can include (i) determining a temperature threshold value by subtracting a differential temperature value and the current temperature offset value from a temperature set point value and (ii) determining whether a temperature of a fluid is less than or equal to the temperature threshold value. The method can include outputting instructions for the burner to turn on, if the temperature of the fluid is less than or equal to the temperature threshold value.

The method can include setting the current temperature offset value to zero, if (i) the temperature of the fluid is less than or equal to the temperature threshold value and (ii) the current temperature offset value is not equal to zero.

The method can include determining whether a maximum temperature offset value is greater than the current temperature offset value, if (i) the temperature of the fluid is greater than the temperature threshold value and (ii) an elapsed time since the burner was last on is greater than or equal to a time threshold value. The method can include incrementing the current temperature offset value; and once again performing the temperature determination, if the maximum temperature offset value is less than the current temperature offset value.

The method can also include receiving and storing user-inputted data indicative of a temperature set point value, a differential temperature value, a time threshold value, and/or a maximum temperature offset value.

The disclosed technology also includes a non-transitory, computer-readable medium storing instructions that, when executed by one or more processors, cause a system to determine whether a burner is on and receive temperature data from a temperature sensor, the temperature data being indicative of the temperature of water in the system. The instructions can cause the system to perform a temperature determination, if the burner is off. The temperature determination can include (i) determining a temperature threshold value by subtracting a differential temperature value and a current temperature offset value from a temperature set point value and (ii) determining, based on the temperature data, whether the temperature of the fluid is less than or equal to the temperature threshold value.

The instructions can cause the system to output instructions for the burner to turn on, if the temperature of the fluid is less than or equal to the temperature threshold value. The instructions can cause the system to set a current temperature offset value equal to zero, if the burner is on.

The instructions can cause the system to set the current temperature offset value to zero, if (i) the temperature of the fluid is less than or equal to the temperature threshold value and (ii) the current temperature offset value is not equal to zero.

The instructions can cause the system to determine whether a maximum temperature offset value is greater than the current temperature offset value, if (i) the temperature of the fluid is greater than the temperature threshold value and (ii) an elapsed time since the burner was last on is greater than or equal to a time threshold value. The instructions can cause the system to increment the current temperature offset value and once again perform the temperature determination, if the maximum temperature offset value is less than the current temperature offset value.

The instructions can cause the system to receive and store a user input received by a user interface. The user interface can be a local display or a remote computing mobile device. The user input can be indicative of at least one of a temperature set point value, a differential temperature value, a time threshold value, or a maximum temperature offset value.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

DETAILED DESCRIPTION

Figure 1:
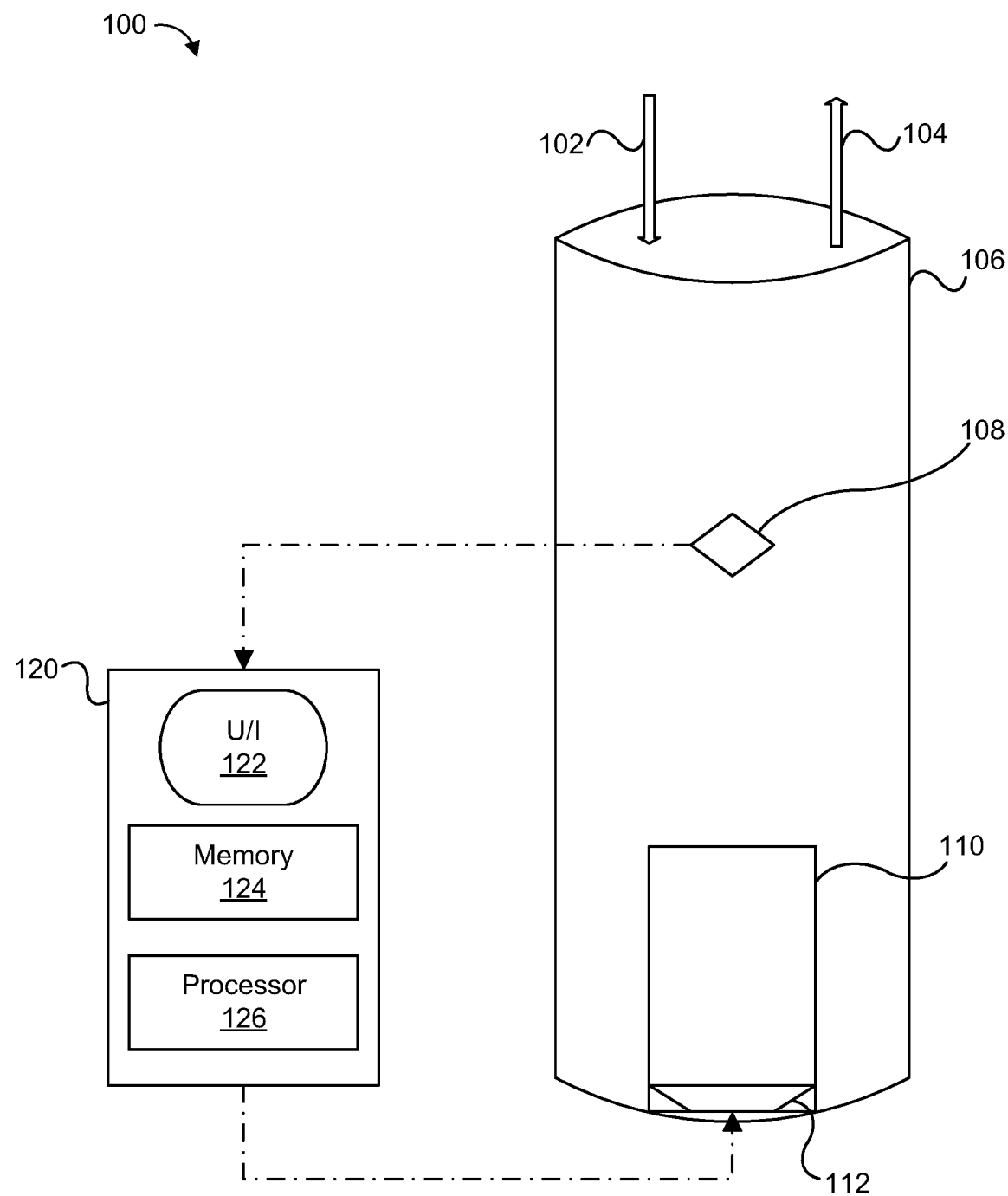
FIG. 1 illustrates a schematic diagram of a water heater system, in accordance with the disclosed technology.

The disclosed technology relates to systems and methods for preventing short cycling in high-efficiency water heaters. For example, the disclosed technology can provide systems and methods for preventing short cycling in high-efficiency water heaters by using a controller to extend the heating time in relation to the amount of time that has elapsed since the last time the burner was fired. The disclosed technology can be incorporated with high-efficiency gas-fired water heater systems that comprise a controller, a temperature sensor, and a burner.

Although certain examples of the disclosed technology are explained in detail, it is to be understood that other examples, embodiments, and implementations of the disclosed technology are contemplated. Accordingly, it is not intended that the disclosed technology is limited in its scope to the details of construction and arrangement of components set forth in the following description or illustrated in the drawings. The disclosed technology is capable of other embodiments and of being practiced or carried out in various ways. In particular, the presently disclosed subject matter is described in the context of being a system for preventing short cycling in high-efficiency water heaters. The present disclosure, however, is not so limited, and can be applicable in other contexts. For example, and not limitation, the present disclosure can improve other heating systems that use a combustion process and develop condensate in the flue gas. This can include heating systems that are heating fluids other than water, including but not limited to, heating ventilation and air conditioning systems (HVAC). This can also include other boiler or furnace systems used in industrial manufacturing processes. Such implementations and applications are contemplated within the scope of the present disclosure. Accordingly, when the present disclosure is described in the context of a system for preventing short cycling in high-efficiency water heaters, it will be understood that other implementations can take the place of those referred to.

Although the described technology is explained throughout this disclosure as being used to prevent short cycling in high-efficiency water heaters, it is also contemplated that the disclosed technology can be used to increase the efficiency of water heaters by operating the burner at lower input rates for longer periods of time. The disclosed technology, for example, can be used to prevent the water heater from engaging the burner at a higher input rate for short burn cycles by lengthening the burn cycle time and operating the burner at a lower input rate.

It should also be noted that, as used in the specification and the appended claims, the singular forms "a," "an" and "the" include plural references unless the context clearly dictates otherwise. References to a composition containing "a" constituent is intended to include other constituents in addition to the one named.

Also, in describing the examples, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the various examples of the disclosed technology includes from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the example methods and processes described herein. That is, the disclosed technology includes methods that omit one or more steps expressly discussed with respect to the examples provided herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

Referring now to the drawings, in which like numerals represent like elements, examples of the present disclosure are herein described. As will be described in greater detail in relation to FIG. 2, the present disclosure can include a system and method of preventing short cycling in a water heater system. To understand the various components of a water heater system and their relation to each other, the various components as shown in FIG. 1 will be discussed first.

As shown in FIG. 1, a water heater system 100 for preventing short cycling in high-efficiency water heaters can have a fluid inlet 102 and a fluid outlet 104. The fluid inlet 102 and the fluid outlet 104 can channel water into and out of a heating chamber 106. Although the fluid inlet 102 and fluid outlet 104 are shown in FIG. 1 as both being located on a top surface of the water heater system 100, the fluid inlet 102 and fluid outlet 104 can be located at any position on the water heater system 100, regardless of whether they are on the same surface or face of the water heater system 100.

The temperature of the fluid can be monitored by a temperature sensor 108, and the fluid can be heated by a burner 112 that heats the fluid through the heat exchanger 110. The water heater system 100 can include a controller 120 configured to receive temperature data of the fluid from the temperature sensor 108. The controller 120 can also be configured to output a control signal to a burner 112 to instruct the burner 112 to begin adding heat to the fluid. The controller 120 can include memory 124 and one or more processors 126. The memory can have instructions stored thereon that, when executed by the processor(s) 126, cause they system 100 to perform actions, such as those described herein. Optionally, the controller 120 can include or be in communication with a user interface 122. One of skill in the art will appreciate that the water heater system 100 can include other components not herein described or fewer components than herein described.

Although shown in FIG. 1 as having a heating chamber 106 shaped like a tank for a common household water heater, the heating chamber 106 can be any size or shape as needed for a particular application. For example, the heating chamber 106 can be a common household water heater or a large commercial water heater. Furthermore, the heating chamber 106 can be made of any suitable material for storing and heating water, including copper, carbon steel, stainless steel, ceramics, polymers, composites, or any other appropriate material. Furthermore, the heating chamber 106 can be treated or lined with a coating to prevent corrosion and leakage. An appropriate treating or coating will be capable of withstanding the demand temperature of the heated water and pressure of the system and can include, as non-limiting examples, glass enameling, galvanizing, thermosetting resin-bonded lining materials, thermoplastic coating materials, cement coating, or any other appropriate treating or coating for the application.

The temperature sensor 108 can be installed in any suitable location that allows the temperature sensor 108 to detect temperature data of fluid at the installed location of the temperature sensor 108. For example, the water heater system 100 can include a temperature sensor 108 installed to measure the temperature of the fluid within the heating chamber 106, the temperature of the fluid proximate the fluid inlet 102, the temperature of the fluid proximate the fluid outlet 104, or in some other location in the system altogether. Although only a single temperature sensor 108 is shown in FIG.1, the water heater system 100 can include more than one temperature sensor 108 (e.g., two, three, four, or more temperature sensors 108).

The temperature sensor 108 can include any type of sensor capable of measuring temperature of a fluid and providing temperature data indicative of the fluid temperature to the controller 120. For example, the temperature sensor 108 can be or include a thermocouple, a resistor temperature detector, a thermistor, an infrared sensor, a semiconductor, or any other type of sensor as appropriate for a given use or application. In water heater systems 100 with multiple temperature sensors 108, all temperature sensors can be the same type of temperature sensor or they can be different types of temperature sensors. For example, one temperature sensor 108 can be a thermocouple while another is a thermistor. One skilled in the art will appreciate that the type, location, and number of temperature sensors can vary depending on the application.

The heat exchanger 110 can be any type of heat exchanger used in a water heater. Specifically, it is contemplated that the heat exchanger is a heat exchanger used in a high-efficiency water heater and is designed to remove as much heat as possible from the exhaust gases. In many high-efficiency water heaters, for example, the heat exchanger 110 is designed to pass the exhaust gases through the heat exchanger more than once to maximize the amount of heat transferred to the water. No matter the design, it is contemplated that the heat exchanger 110 is arranged such that condensate can accumulate as moisture is condensed from the exhaust gases.

The burner 112 can be any type of burner used in a water heater. For example and not limitation, the burner 112 can be a propane or natural gas burner ignited by a pilot light or electric source. Furthermore, the burner 112 can be arranged in any arrangement suitable for the particular location. One of skill in the art will appreciate that the burner 112 can be any form of burner so long as the burner 112 is able to facilitate the combustion process and send the combustion gases and resultant heat through the heat exchanger to heat the water.

The burner 112 can be controlled by the controller 120. The controller 120 can have a user interface 122, a memory 124, and a processor 126. The controller 120 can be a computing device configured to receive data, determine actions based on the received data, and output a control signal instructing one or more components of the system to perform one or more actions. One of skill in the art will understand that the controller 120 can be installed in any location, provided the controller 120 is in communication with at least some of the components of the system. This can include installation in or on an enclosure including one or more of the other components depicted in FIG. 1 or installation at a remote location physically separated from the components shown in FIG. 1. Furthermore, the controller 120 can be configured to send and receive wireless or wired signals; the controller 120 can be configured to send and receive analog or digital signals. The wireless signals can include Bluetooth™, BLE, WiFi™, ZigBee™, infrared, microwave radio, or any other type of wireless communication as may be appropriate for the particular application. The hard-wired signal can include any directly wired connection between the controller and the other components. For example, the controller 120 can have a hard-wired 24 VDC connection to the burner 112. Alternatively, the components can be powered directly and receive control instructions from the controller 120 via a digital connection. The digital connection can include a connection such as an Ethernet or a serial connection and can utilize any appropriate communication protocol for the application such as Modbus, fieldbus, PROFIBUS, SafetyBus p, Ethernet/IP, or any other appropriate communication protocol for the application. Furthermore, the controller 120 can utilize a combination of wireless, hard-wired, and digital communication signals to communicate with and control the various components. One of skill in the art will appreciate that the above configurations are given merely as non-limiting examples and the actual configuration can vary depending on the application.

The user interface 122 can be any user interface in communication with the controller 120 and configured to display an output to the user and receive an input from a user. The user interface 122 can include a user interface built-in to the controller 120 unit itself or the user interface 122 can be separate from the controller 120 altogether. The user interface 122, for example, can be integrated with the controller 120 and/or can be mounted to the heating chamber 106 so that the user can configure the settings of the water heater system 100 at the location where the water heater system 100 is installed. Alternatively or in addition, a user interface 122 can be physically separated from the water heater system 100 and/or mounted in a more convenient location so that a user can easily access the user interface 122. Alternatively or in addition, the user interface 122 can be accessible by a remote computing device, such as a handheld mobile device, configured to communicate with the controller 120, which can enable a user to adjust the settings of the controller 120 at a location remote from the location of the water heater system 100. One of skill in the art will appreciate that the user interface 122 can be any user interface configured to output data to a user and to receive input from a user. Optionally, multiple user interfaces 122 can be provided (e.g., a local user interface 122 mounted to the water heater system 100 and a remote user interface 122 accessible from a computing device)

The user interface 122 can be configured to display information regarding various performance measures and settings related to the water heater system 100. For example, the user interface 122 can be configured to display a current temperature of the fluid, system health information, or stored values relating to a high temperature set point, a low temperature set point, a differential temperature value, a time threshold value, a maximum temperature offset value, a current temperature offset value, a current temperature threshold value, as well as other information that may be of use to the user. Furthermore, the user interface 122 can be configured to facilitate a user's adjustment of various settings to alter and/or optimize the performance of the water heater system 100 for the particular application or according to a user's preference.

The controller 120 can include memory 124 that can store a program and/or instructions associated with the functions and methods described herein and can include one or more processors 126 configured to execute the program and/or instructions. The memory 124 can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including the operating system, application programs (including, for example, a web browser application, a widget or gadget engine, and or other applications, as necessary), executable instructions and data. One, some, or all of the processing techniques described herein can be implemented as a combination of executable instructions and data within the memory.

As depicted in FIG. 1, the controller 120 can be configured to receive data from the temperature sensor 108 and optionally control the burner 112. The controller 120 can be configured to engage the burner 112 and other components only when necessary, which can reduce the amount of power required to operate the system over a given period of time (e.g., a year). The controller 120 can receive temperature data from the temperature sensor 108 determine whether the temperature data indicates a temperature that is less than a predetermined low temperature setting, and activate the burner 112 if the detected temperature is less than the predetermined low temperature setting (a "low temperature"). In water heater systems with multiple temperature sensors 108, the controller 120 can determine the detected temperature is a low temperature based on one, some, or all of the temperature sensors of the water heater system 100, which can correspond to the detected water temperatures at multiple positions throughout the water heater system 100. For example, the controller 120 can be configured to engage the burner 112 if any single temperature sensor 108 detects a low temperature. As another example, the controller 120 can be configured to engage the burner 112 only if all temperature sensors 108 detect a low temperature. As yet another example, the controller 120 can be configured to engage the burner 112 if a predetermined number (e.g., a majority) of temperature sensors 108 detect a low temperature. As yet another example, the controller 120 can be configured to engage the burner 112 if a predetermined combination of temperature sensors 108 detect a low temperature. That is, the controller 120 can be configured to weigh data from a given temperature sensor more heavily than data from another temperature sensor, based on the location, type, accuracy, or other aspect of the temperature sensors.

Figure 2:
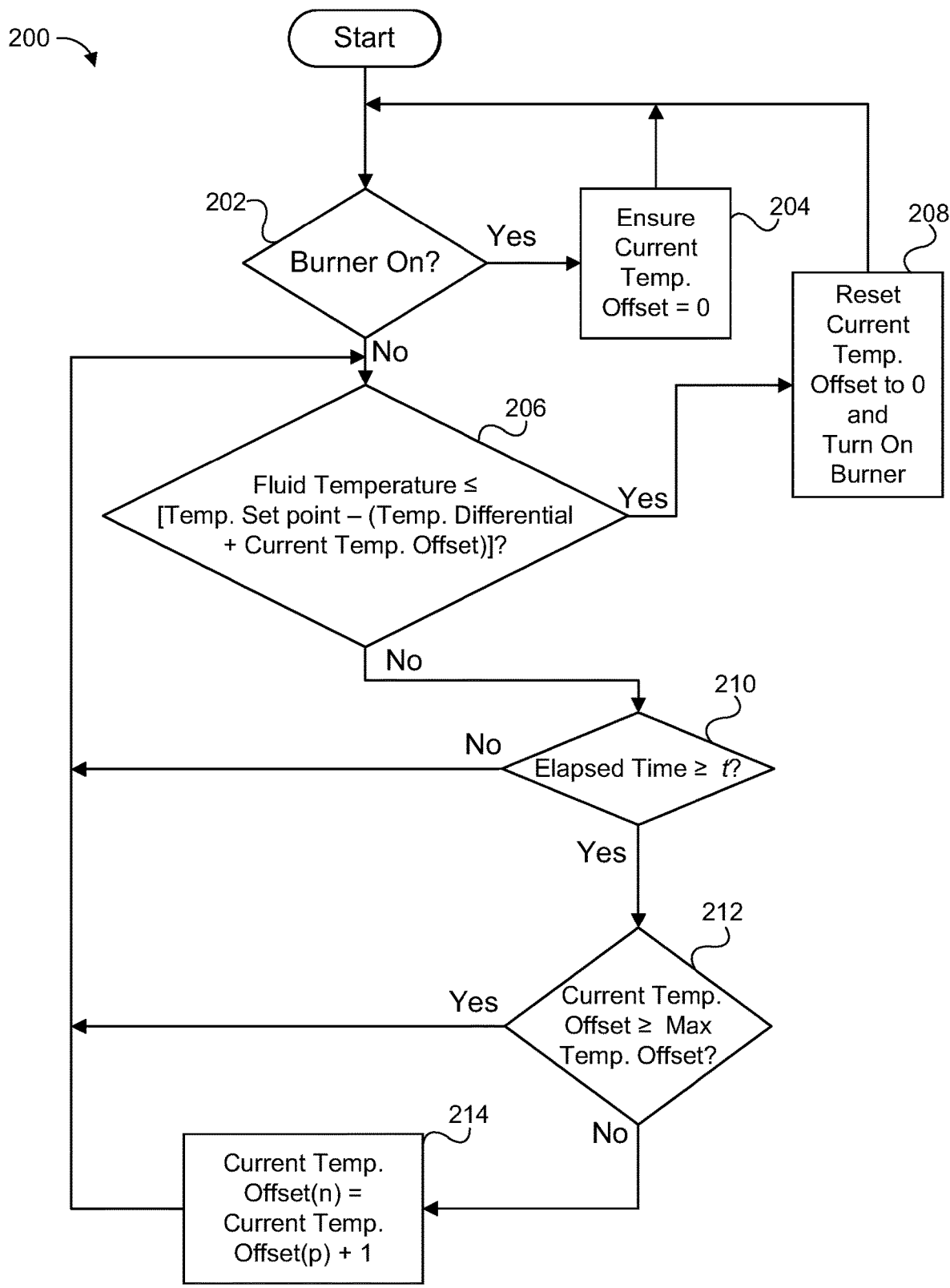
FIG. 2 illustrates a logic diagram for a method of preventing short cycling, in accordance with the disclosed technology.

FIG. 2 illustrates a logic diagram for a system and method of preventing short cycling according to one example of the disclosed technology. As discussed previously, the water heater system 100 can have a controller 120. The controller 120 can be configured to implement a method of preventing short cycling 200 as shown in FIG. 2. In one example, the method 200 can be a program stored on the memory 124 and executed by the processor 126. Furthermore, various elements of the method 200 can be modified by a user (e.g., predetermined values and/or settings stored in the memory 124 can be changed via data inputted via the user interface 122). Modifiable values or settings can include, but are not necessarily limited to, a temperature set point, a temperature differential value, a time threshold value, and/or a maximum temperature offset value. Furthermore, some or all of these values can be permanently programmed into the memory 124 (e.g., non-modifiable or preconfigured) when manufactured or installed.

The method 200 can begin by determining 202 if the burner is on. If the burner (e.g., burner 112) is on, a controller (e.g., controller 120) can ensure 204 that a current temperature offset value is set to 0. If the current temperature offset it not set to 0, the controller can set the current temperature offset to 0.

If the burner 112 is off, the controller can perform a temperature determination 206 by checking whether a current fluid temperature is less than or equal to a temperature threshold value. The temperature threshold value can be obtained by subtracting a temperature differential value and a current temperature offset value from a temperature setpoint value. For example, the temperature determination 206 can be completed by using the following equation:

Fluid Temp.≤Temp. Threshold Value where

Temp. Threshold Value=[Temp. Set Point−(Temp. Diff.+Current Temp.Offset)]

As will be appreciated, the temperature set point referenced in the equation can be the same or similar to the high temperature set point of traditional water heater systems, and the difference of the temperature set point and the temperature differential (i.e., Temp.Set Point−Temp.Diff.) can be the same or similar to the low temperature set point of traditional water heater systems.

If, when performing the temperature determination 206, the fluid temperature is less than or equal to the temperature threshold value, the controller can reset the current temperature offset value to 0 and ignite the burner to begin heating the fluid. The controller can then restart the method 200 by checking if the burner is currently on.

If, when performing the temperature determination 206, the fluid temperature is greater than the temperature threshold value, the controller can proceed to determine 210 if the elapsed time since the burner was last on (i.e., the elapsed time since the burner last stopped burning fuel) is greater than or equal to a time threshold value t. As discussed previously, the time threshold value t can either be a permanent value or a user-configurable value. If the elapsed time since the burner was last on is less than the time threshold value, the controller can once again perform the temperature determination 206 and repeat the sequence.

If the time since the burner was last on is greater than or equal to the time threshold value t, the controller can proceed to determine 212 if the current temperature offset value is greater than or equal to the maximum temperature offset value. As discussed previously, the maximum temperature offset value can be a permanent value or a user-configurable value. If the current temperature offset value is greater than or equal to the maximum temperature offset value, the controller can once again perform the temperature determination 206 and repeat the sequence (e.g., as shown in FIG. 2).

If the current temperature offset value is less than the maximum temperature offset value, the controller can increment 214 the current temperature offset value by 1 and then perform the temperature determination 206 over again and repeat the sequence. The current temperature offset value can be incremented by a value of 1 until the maximum temperature offset value is reached. Although a temperature offset increment of 1 is discussed herein, any scalar value is contemplated. For example, the method 200 can include incrementing the current temperature offset value by 0.5, 2, or any other number.

Accordingly, the method 200 can extend the time between cycles of the burner, such that when the burner does engage, the burner can increase the temperature of the fluid gases to a temperature high enough to sufficiently burn off condensate that has accumulated over time. That is, the temperature of the fluid gases can be high enough to convert the condensate to steam, which can then be expelled with the combustion gases. Moreover, the method 200 can remove the condensate while reducing and/or minimizing any negative impact to the overall efficiency of the water heater system 100.

Example Use Case

For illustration, an example implementation of the above disclosed technology is provided. The following example, however, should not be construed as limiting and is offered merely for illustrative purposes. In an example water heater system (e.g., water heater system 100), a method for preventing short-cycling (e.g., method 200) can be implemented using the following user-selected variables:

Temperature set point=120° F.
Temperature differential value=10° F.
Time threshold value=30 minutes
Maximum temperature offset value=5° F.

In this example, a controller (e.g. controller 120) determines if the burner (e.g., burner 112) is on. If the burner is on, the controller ensures that the current temperature offset value is set to 0, which includes setting the current temperature offset to 0 if it is not already set to 0. If the burner is off, the controller determines whether the current fluid temperature is less than or equal to a temperature threshold value. The temperature threshold value can be obtained by subtracting the temperature differential value (10° F. in this example) and a current temperature offset value (initially equal to 0 in this example) from the temperature setpoint value (120° F. in this example). That is, as an aside, if the current fluid temperature value was 115° F., the controller would conclude that the current fluid temperature was higher than the temperature threshold value according to the following equation:

115° F.≤[120° F.−(10° F.+0° F.)]

To continue with this example, after determining that the current fluid temperature was higher than the temperature threshold, the controller would determine whether the elapsed time since the burner was last on is greater than or equal to the time threshold value (30 minutes in this example). For illustration, if the current elapsed time since the burner was last on was 28 minutes, the controller would determine that the elapsed time since the burner was last on is less than the time threshold value, and the controller would once again perform the temperature determination and repeat the subsequent sequence.

On the other hand, if the time since the burner was last on was, for example, 32 minutes, the controller would proceed to determine whether the current temperature offset value was greater than or equal to the maximum temperature offset value (5° F. in this example).

If the current temperature offset value was 5° F. or greater, the controller would once again perform the temperature determination 206 and repeat the sequence. On the other hand, if the current temperature offset value was, for example, 3° F., the controller would increment the current temperature offset value by 1 (or any other predetermined value) and then perform the temperature determination over again with a current temperature offset value of 4° F. instead of 3° F. If additional time passed with the burner remaining off, the process would continue to repeat until the maximum temperature offset value reached 5° F. At which time, the controller would no longer increment the temperature offset value but would continue to perform the temperature determination and subsequent steps until the fluid temperature fell below the temperature threshold value and the burner was ignited. Once the burner was ignited, the process would begin all over again by the controller determining whether the burner was on. Although the example just described uses specific values for illustrative purposes, the values should not be construed as limiting. Furthermore, one of skill in the art would appreciate that the values could be varied depending on the specific application and according to a user's preferences.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. But other equivalent methods or composition to these described aspects are also contemplated by the teachings herein. Therefore, the present disclosure should not be limited to any single aspect, but rather construed in breadth and scope in accordance with the appended claims.

What is claimed is:

1. A water heater system for preventing short cycling, the water heater system comprising:
    a burner configured to burn a fuel to produce heat;
    a heat exchanger in fluid communication with the burner, the heat exchanger configured to provide heat to a fluid in a heating chamber;
    a temperature sensor configured to detect a temperature of the fluid; and
    a controller in communication with the burner and configured to:
        receive temperature data from the temperature sensor, the temperature data indicative of the temperature of the fluid;
        responsive to determining that the burner is on, automatically set a current temperature offset value equal to zero;
        responsive to determining that the burner is off, perform a temperature determination comprising:
            determining a temperature threshold value by subtracting a predetermined differential temperature value and the current temperature offset value from a temperature set point value; and
            determining, based on the temperature data, whether the temperature of the fluid is less than or equal to the temperature threshold value; and
        responsive to determining that the temperature of the fluid is less than or equal to the temperature threshold value, output instructions for the burner to turn on and heat the fluid to the temperature set point value.

2. The water heater system of claim 1, wherein the controller is further configured to:
    responsive to determining that (i) the temperature of the fluid is less than or equal to the temperature threshold value and (ii) the current temperature offset value is not equal to zero, set the current temperature offset value to zero.

3. The water heater system of claim 1, wherein the controller is further configured to:
    responsive to determining that (i) the temperature of the fluid is greater than the temperature threshold value and (ii) an elapsed time since the burner was last on is greater than or equal to a time threshold value, determine whether a current temperature offset value is greater than or equal to the maximum temperature offset value.

4. The water heater system of claim 3, wherein the controller is further configured to:
    responsive to determining that the current temperature offset value is less than the maximum temperature offset value:
        increment the current temperature offset value until the maximum temperature offset value is reached; and
        perform the temperature determination.

5. The water heater system of claim 1 further comprising a user interface configured to receive user input.

6. The water heater system of claim 5, wherein the user interface is a remote computing mobile device.

7. The water heater system of claim 1, wherein at least one of the temperature set point value, the predetermined differential temperature value, a time threshold value, and a maximum temperature offset value is received from a user.

8. A method for preventing short cycling in a water heater system, the method comprising:
    determining whether a burner is on;
    responsive to determining that the burner is on, setting a current temperature offset value equal to zero; and
    responsive to determining that the burner is off, performing a temperature determination comprising:
        determining a temperature threshold value by subtracting a predetermined differential temperature value and the current temperature offset value from a temperature set point value; and
        determining whether a temperature of a fluid is less than or equal to the temperature threshold value; and
    responsive to determining that the temperature of the fluid is less than or equal to the temperature threshold value, outputting instructions for the burner to turn on and heat the fluid to the temperature set point value.

9. The method of claim 8 further comprising:
responsive to determining that (i) the temperature of the fluid is less than or equal to the temperature threshold value and (ii) the current temperature offset value is not equal to zero, setting the current temperature offset value to zero.

10. The method of claim 8 further comprising:
responsive to determining that (i) the temperature of the fluid is greater than the temperature threshold value and (ii) an elapsed time since the burner was last on is greater than or equal to a time threshold value, determining whether a current temperature offset value is greater than or equal to the maximum temperature offset value.

11. The method of claim 10 further comprising:
responsive to determining that the current temperature offset value is less than the maximum temperature offset value:
incrementing the current temperature offset value until the maximum temperature offset value is reached; and
performing the temperature determination.

12. The method of claim 8, further comprising:
receiving and storing user-inputted data indicative of at least one of the temperature set point value, the predetermined differential temperature value, a time threshold value, and a maximum temperature offset value.

13. A non-transitory, computer-readable medium storing instructions that, when executed by one or more processors, cause a system to:
receive temperature data from a temperature sensor configured to detect the temperature of a fluid;
determine whether a burner is on;
responsive to determining that a burner is off, perform a temperature determination comprising:
determining a temperature threshold value by subtracting a predetermined differential temperature value and a current temperature offset value from a temperature set point value; and
determining, based on the temperature data, whether the temperature of the fluid is less than or equal to the temperature threshold value; and
responsive to determining that the temperature of the fluid is less than or equal to the temperature threshold value, output instructions for the burner to turn on and heat the fluid to the temperature set point value.

14. The non-transitory, computer-readable medium of claim 13, wherein the instructions, when executed by one or more processors, further cause a system to:
responsive to determining that the burner is on, automatically set a current temperature offset value equal to zero.

15. The non-transitory, computer-readable medium of claim 13, wherein the instructions, when executed by the one or more processors, further cause the system to:
responsive to determining that (i) the temperature of the fluid is less than or equal to the temperature threshold value and (ii) the current temperature offset value is not equal to zero, set the current temperature offset value to zero.

16. The non-transitory, computer-readable medium of claim 13, wherein the instructions, when executed by the one or more processors, further cause the system to:
responsive to determining that (i) the temperature of the fluid is greater than the temperature threshold value and (ii) an elapsed time since the burner was last on is greater than or equal to a time threshold value, determine whether a current temperature offset value is greater than or equal to the maximum temperature offset value.

17. The non-transitory, computer-readable medium of claim 13, wherein the instructions, when executed by the one or more processors, further causes the system to:
responsive to determining that the current temperature offset value is less than the maximum temperature offset value:
increment the current temperature offset value until the maximum temperature offset value is reached; and
perform the temperature determination.

18. The non-transitory, computer-readable medium of claim 13, wherein the instructions, when executed by the one or more processors, further cause the system to receive and store a user input received by a user interface.

19. The non-transitory, computer-readable medium of claim 18, wherein the user input is received from a remote computing mobile device.

20. The non-transitory, computer-readable medium of claim 18, wherein the user input comprises the temperature set point value, the predetermined differential temperature value, a time threshold value, or a maximum temperature offset value.

* * * * *